United States Patent

[11] 3,616,166

| [72] | Inventor | Louis E. Kelley<br>Wyncote, Pa. |
|---|---|---|
| [21] | Appl. No. | 812,416 |
| [22] | Filed | Apr. 1, 1969 |
| [45] | Patented | Oct. 26, 1971 |
| [73] | Assignee | Rohm and Haas Company<br>Philadelphia, Pa. |

[54] ADHESIVE COMPOSITION AND BONDED NONWOVEN FABRICS
6 Claims, No Drawings

[52] U.S. Cl............................................. 161/148,
117/161 UB, 117/161 UC, 161/170, 260/21.6 RB,
260/901
[51] Int. Cl......................................................C08f 29/46,
C08f 29/50, C09j 3/14
[50] Field of Search............................................ 260/29.6
RU, 901; 117/161 UC, 161 UB; 161/170

[56] References Cited
UNITED STATES PATENTS

| 2,850,478 | 9/1958 | Coover et al. | 260/45.5 |
|---|---|---|---|
| 2,887,464 | 5/1959 | Coover et al. | 260/45.5 |
| 3,228,790 | 1/1966 | Sexsmith et al. | 117/138.8 |
| 3,249,463 | 5/1966 | Carlee | 117/76 |
| 3,316,199 | 4/1967 | Murphy | 260/29.6 |
| 3,351,602 | 11/1967 | Dunnavant et al. | 260/29.6 |

*Primary Examiner*—William H. Short
*Assistant Examiner*—E. Nielsen
*Attorneys*—Carl A. Castellan and George W. F. Simmons ABSTRACT: This invention is concerned with adhesive compositions having special use as a binder for nonwoven fabrics and comprises a "polyblend," that is an aqueous dispersion of two different polymers obtained by emulsion polymerization. The first component of the polyblend is a polymer of ethyl acrylate having relatively low molecular weight such as from about 150,000 up to 300,000 viscosity average. The other component is an addition polymer made by emulsion polymerization of ethylenically unsaturated monomers comprising one or more members which when homopolymerized tend to produce hard polymers so that the emulsion polymer is one having a minimum film forming temperature (MFT) of at least about 50° C.

ADHESIVE COMPOSITION AND BONDED NONWOVEN FABRICS

DESCRIPTION OF THE INVENTION

It is known that emulsion polymers made from acrylic esters such as ethyl acrylate by the usual emulsion polymerization procedures yield polymers of high molecular weight such as about 500,000 to several million. It has been suggested heretofore to use such a high molecular weight polymer of ethyl acrylate as a binder for nonwoven fabrics. However, when such a binder is employed and the nonwoven fabric obtained is passed through heat sealing equipment, a satisfactory heat seal is obtained when there is no stress applied to the points of bonding as is the case when two sheets of the bonded fabrics are sealed together by heating around the edges of the overlapped sheets while in flat condition. However, it is frequently desired to form a single sheet into a sleevelike wrapper or tube which involves the bending of the sheet in such a way as to overlap a portion, such as an edge of the sheet, with another portion, such as the opposite longitudinal edge. When a high molecular weight emulsion polymer of ethyl acrylate is the binder in such a nonwoven sheet, the sheet has such resilience and springiness that the tension exerted along the line of bonding by the resilience of the bonded fabric frequently is so strong that it pulls the bond apart immediately after removal of the pressure by the heated jaws or rollers of the bonding mechanism.

It is an object of the present invention to provide a binder which is adapted to be heat sealed whether or not the bonded fabric is in a state of rest as when it is lying flat or in a state of tension resulting from the bending or flexing of the sheet into some three-dimensional configuration such as to form a closed sleeve or tube. It is also an object to provide a binder which gives a nontacky, nonresilient bond upon cooling.

In order to accomplish the objects of the present invention, a binder of adhesive composition is provided which comprises two essential components. The first of these components (sometimes referred to hereinafter as component 1) is an aqueous dispersion of a polymer of ethyl acrylate having a low molecular weight. The second component (sometimes hereinafter referred to as component 2) is an aqueous dispersion of an emulsion polymer having an MFT of about 50° C. or higher. Both dispersions are of such character that they can be mixed together to form what is sometimes herein referred to as a "polyblend" without effecting coagulation. In other words, they have similar ionic character. For example, both may be made with an anionic emulsifier or both may be made with nonionic emulsifiers or with a mixture of anionic and nonionic emulsifiers. Similarly, both may be made with cationic emulsifiers or mixtures of cationic emulsifiers with nonionic emulsifiers. In general, if one is made with an anionic emulsifier, the other may be made with either a nonionic or anionic emulsifier but is generally restricted as to any content of cationic emulsifier. A small amount of a cationic emulsifier may be present but it is preferred that if it is present when the other polymer dispersion contains an anionic emulsifier, there should be sufficient nonionic emulsifier in one or both of the systems to prevent the cationic and the anionic emulsifiers from coagulation the system.

The other component (i.e. component (2)) is an aqueous dispersion of a polymer made by emulsion polymerization, the polymer being either a homopolymer or a copolymer of one or more monoethylenically unsaturated compounds having the group

the monomer or monomers employed in making the polymer being such as to provide in the product an MFT of at least 50° C. Thus, for this purpose, the second polymer may be polyvinyl chloride, polymethyl methacrylate, polystyrene, polyvinyl toluene, polyacrylonitrile or copolymers of any one of these monomers with each other or with other monoethylenically unsaturated monomers such as a vinyl ester of a ($C_1$–$C_{18}$) alkanoic acid including vinyl acetate, vinyl butyrate, vinyl laurate, and vinyl stearate; one or more esters of acrylic acid or methacrylic acid with an alcohol having 1 to 18 carbon atoms such as methyl acrylate, ethyl acrylate or methacrylate, butyl acrylate or methacrylate, 2-ethylhexyl acrylate, or methacrylate, lauryl acrylate or methacrylate, cyclohexyl acrylate or methacrylate, isobornyl acrylate or methacrylate, and stearyl acrylate or methacrylate, vinylidene chloride, diesters of a ($C_1$ to $C_8$) alkanol with a dicarboxylic acid such as fumaric acid, maleic acid, citraconic acid, and itaconic acid. The proportion of any monomer which when homopolymerized yields a polymer having an MFT below 50° C., should be predetermined to assure the copolymer produced as component 2 herein has an MFT of at least about 50° C. The upper limit of MFT is not critical and may be anywhere from 60° to 150° C.

The two polymer dispersions are ordinarily separately prepared and then mixed. However, the two polymers may be sequentially polymerized in a single container. The concentration of the polyblend may range from 10 to 40 percent solids. For saturating the entire area of a nonwoven fleece or sheet, lower concentrations of 10 to 20 percent are generally desirable whereas high concentrations, even those of 30 to 40 percent or more, may be employed when selected areas are to be printed with the blend composition. The relative proportion of the two components may range from 60 to 90 percent by weight of the first component (polymer of ethyl acrylate) and 40 to 10 percent by weight respectively of the high MFT polymer. In general, the MFT of the polyblend is about room temperature or below.

The first component polymer may be a homopolymer of ethyl acrylate or it may contain up to 30 percent by weight of such other monomers as methyl acrylate or a ($C_3$ to $C_8$) alkyl acrylate or a ($C_2$ to $C_8$) alkyl methacrylate, vinyl acetate, or vinylidene chloride. It may contain up to 5 percent by weight of methyl methacrylate, styrene, acrylonitrile, vinyl chloride, or vinyl toluene. While the ethyl acrylate polymer is generally adequately adhesive relative to various fibers, and particularly cellulosic varieties, nevertheless, it may be desirable to include other monomers which increase adhesiveness towards various fibers. For this purpose the copolymer may contain up to 5 percent by weight of any $\alpha,\beta$-monoethylenically unsaturated acid such as acrylic acid, methacrylic acid, aconitic acid, citraconic acid or the acid containing monoesters of the aforementioned dicarboxylic acids, such as monethyl itaconate, maleate or fumarate. Again, small amounts up to 1 percent by weight of acrylamide, methacrylamide, or the N-methylol derivatives of these amides may be incorporated in the polymer. Preferably, the latter monomers are used in amounts of about 0.4 percent to 0.6 percent by weight. The amide monomers, particularly the N-methylol derivatives, serve to impart water resistance as a result of some cross-linking effect in the polyblend after deposition on the fabric.

The monomeric components of the ethyl acrylate are so chosen that the polymer has an MFT at room temperature or lower and the proportion of chain transfer agent, examples of which are given hereinafter, is controlled to provide molecular weights in the range of about 150.000 to 300,000 viscosity average.

The polymer of ethyl acrylate of low molecular weight is a "nonrubbery" thermoplastic polymer but if it were to be used alone, it would be undesirably tacky in bonded nonwoven products. By incorporating with it an appropriate proportion of one or more of the various high MFT polymers constituting component 2 of the present invention, the tackiness is overcome. The ethyl acrylate polymer provides desirable adhesiveness to bond the fibers and it is thermoplastic so that it is adapted to be heat-sealed. It is also reasonably water-resistant and acid-resistant but not so strongly resistant to water and acid as to resist disintegration on prolonged soaking of several days or more in aqueous media or on soaking for several hours in aqueous media containing detergents of alkaline character.

The low molecular weight polymer of ethyl acrylate bonds the fibers without imparting a high degree of resilience to the bonded fabric. The bonded fabric is characterized by an almost limp character and upon folding or creasing recovery is only mild. The incorporation of the high MFT component enhances the limpness and increases the slowness of recovery from folding as well as overcoming disadvantageous tackiness without interfering with heat-sealing properties.

As normally deposited at room temperature or at temperatures below the MFT of the hard component, the polyblend exists essentially as a film of the ethyl acrylate polymer enclosing discrete particles of the high MFT polymer. Some of the high MFT particles are distributed adjacent the surface of the film of ethyl acrylate polymer in such a way as to provide reduced tackiness of the surface. Hence, the high MFT polymer may be considered analogous to a pigment in this heterogeneous system. However, when the polyblend is deposited at temperatures above the MFT of the high MFT component, the particles of the latter tend to become fused into the film of ethyl acrylate polymer, the extent of fusing increasing with increasing temperatures and times at which the temperature above the MFT of the second component is maintained. At points of heat-sealing, the high MFT polymer is also blended into the ethyl acrylate polymer to more or less extent by virtue of the temperature imparted by the jaws, rollers, or platens of the heat-sealing device. Here again, the extent of fusion depends on the temperature and time of maintenance during the heat-sealing operation.

The dispersions of high MFT polymer may be made by any of the known emulsion copolymerization procedures, e.g. by first mixing the several monomers in the desired proportions into an aqueous solution of an anionic, a cationic, or preferably a nonionic, dispersing or emulsifying agent.

Examples of anionic emulsifying agents that may be used include the higher fatty alcohol sulfates, such as sodium lauryl sulfate, the alkylaryl sulfonates such as sodium t-octylphenyl sulfonates, the sodium di-octyl sulfosuccinates and so on. Examples of cationic emulsifiers include trimethyl (dodecyl benzyl) ammonium chloride, and octadecylpyridinium chloride. Examples of the nonionic dispersing agents that may be used for preparing the monomeric emulsions before copolymerization or dispersions of the polymer after polymerization include the following: alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of 6 to 15 carbon atoms; ethylene oxide derivatives of long-chained carboxylic acids, such as lauric myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymer of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such a tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01 percent to 1.0 percent, based on the weight of the monomers, of the peroxidic agent and the same or lower proportions of the reducing agent are recommended. In this way it is possible to prepare dispersions which contain as little as 1 percent and as much as 60 percent or 70 percent of the resinous copolymer on a weight basis. It is, however, more practical—hence preferred —to produce dispersions which contain about 30 percent to 50 percent resin solids.

Except for the inclusion of about 0.2 to 5 percent, and preferably 0.2 to 1.5 percent by weight, based on the weight of monomers of a chain-transfer agent, the ethyl acrylate polymer dispersion may be made by any of the conventional emulsion polymerization procedures. For example, the polymerization procedures just described for the production of the aqueous dispersions of the high MFT polymer may be employed provided the proportion of a chain-transfer agent or chain regulator just specified above is included within the polymerization mixture in addition to the other ingredients. The chain-transfer agents which serve to reduce the molecular weight of the polymer obtained by the emulsion polymerization procedure in proportion to the amount of chian-transfer agents used may be any one of the following: long-chain alkyl mercaptans, e.g. t-dodecyl mercaptan, isopropanol, isobutanol, long-chain alcohols, e.g. lauryl alcohol, t-octyl alcohol, methylallyl chloride, $CCl_4$, $C_2Cl_4$, and $CBrCl_3$.

The polyblend binder or adhesive composition of the present invention is pressure sensitive as well as thermoplastic and may be employed for adhesively joining many things. For example, it may be used for joining surfaces of wood to plastic materials, plastics to metals, metals to metals, plastics to glass and so on. The adhesive is particularly valuable as a binder for nonwoven webs or fleeces of fibers or filaments and also as a saturant for paper. They are thermoplastic and heat-sealable and can serve quite efficiently in heat-sealing areas juxtaposed by bending operation as in the formation of a sleeve or tube by overlapping a longitudinal edge with the opposite longitudinal edge and applying heat as by means of heated rollers, jaws, or platens. These heating implements may be in pressing contact with the opposed surfaces of the overlapped portions of the nonwoven fabric but the fabric comprising the binder of the present invention does not exhibit such a strong resilience as to pull the bond open upon the movement of the fabric out of the bonding area away from contact with the sealing implements.

Because of the pressure-sensitive character of the adhesive, various surfaces and materials to be bonded with the polyblend adhesives can be lightly sealed, tacked, or adhered without resorting to heated platens by simply pressing the adhesive-covered surfaces together. This is an advantage when substrates or some component of the combined materials may be damaged by heat. The flow of the adhesive under pressure also allows the use of less complex sealing machinery.

The fiber sheets may be formed from textile length fibers by carding and, if desired, by superimposing a plurality of such carded webs on each other, preferably with the machine direction of the webs being alternated at right angles to each other in the superimposed webs. They may also be formed in completely haphazard fashion such as in a Rando-Weber. Alternatively, they may be of either paper making or fiber making length and deposited from an air stream of aqueous liquid stream conveying the fibers suspended therein to the point of deposit.

The fibers of the nonwoven web may be cellulosic, such as cotton, linen, rayon or cellulose esters such as cellulose acetate or cellulose acetate butyrate. They may be of wool, casein, alpha protein, nylon, polyesters, such as polyethylene glycol terephthalate, or of addition polymers such as polyacrylonitrile or copolymers of acrylonitrile with ethyl acrylate, methyl acrylate and other materials, copolymers of vinyl chloride or vinylidene chloride with vinyl acetate, acrylonitrile, or acrylic esters, silk, asbestos, glass or mineral wool or fibers of metal such as aluminum.

The binder may be applied to the nonwoven fabric in any suitable way such as by immersing the fabric within the aqueous dispersion of the polyblend which may be accomplished by passing continuously a fleece or web of indefinite length about a roll submerged in the polyblend dispersion. Alternatively, the dispersion may be applied by spraying it over the surface of the fleece or web which may be continuously passed beneath the spray head. When the polyblend is applied over the entire area, the amount of polymer that is applied may be from 20 to 100 percent by weight based on the weight of the dried fibers. Besides applying the dispersion of polyblend over the entire area of the nonwoven web or fabric, it may be applied in preselected areas such as by passing the nonwoven web about a transfer roller having circumferential lines parallel to each other to provide parallel lines extending the full length of the fleece or web. The transfer roller may be replaced with others having other patterns of raised lines or areas as so to provide intersecting sets of lines of the binder on the nonwoven web which may provide interstitial spaces between the sets of lines of diamond, rectangular, square, triangular or other shapes. There is no limit to the character of printed pattern of the binder that can be applied by means of rolls having lands of any predetermined character. By applying the polyblend to selected areas of the fabric, the total amount applied can be greatly reduced although in the area of application the amount of polymer is preferably still approximately 20 to 100 percent by weight of polymer based on the weight of dry fibers in the area or areas to which the polyblend is applied.

After application of the binder, it may be dried at room temperature or at any desired elevated temperatures such as 100° to 150° C. or higher. Preferably, the drying is effected at a temperature below the MFT of the high MFT component of the binder but for some purposes it may be desirable to dry at a temperature higher than that MFT to provide partial or complete fusion of the two polymers in the polyblend.

Preferably, the heat-sealing is effected by elements (jaws, platens, or rollers) having a temperature above the MFT of the high MFT component. The heat-sealing elements may be heated by means of electric resistance elements or by high frequency dielectric energy. Alternatively, the platens, jaws, or rollers may be internally heated by the circulation of heated fluids therein.

The bonded nonwoven webs or fabrics can be formed into all sorts of packaging or wrapping materials which may be of various porosity in respect to liquids and/or gases including air. Even when the polyblend is distributed over the entire area of the web or fabric in the proportions specified hereinabove, the fabric is still highly porous to liquids and also somewhat porous to gases. However, this porosity to both gases and liquids can be increased by applying the binder to preselected areas leaving interstitial areas provided with no binder. Examples of uses include the packaging of tea, coffee, or similar beverage solids in unit parcels such as the well-known tea bags in which two of the nonwoven webs are placed one above and one below the parcel of powder and then is heat-sealed around the periphery of the superimposed webs. Similarly, a tube or sleeve may be formed by overlapping the opposite longitudinal edges of a continuously supplied web or sheet by heat sealing the overlapped edges and such tubing or sleeve may be used as a wrapper for tampons, catamenial pads, sanitary napkins, filters for liquids and/or gases and many other articles. Because of the limp character of the bonded fabric, such sleeves are readily formed and have no tendency to pull apart immediately after passing beyond the heating elements of the heat-sealing device.

To assist those skilled in the art to practice the present invention, the following modes of operation are suggested by way of illustration, parts and percentages being by weight and the temperature in °C. unless otherwise specifically noted.

COPOLYMER A

A copolymer (molecular weight about 190,000 viscosity average) is prepared by emulsion polymerization of ethyl acrylate 70, methyl acrylate 27.9, itaconic acid 1.5, acrylamide 0.2, methylol acrylamide 0.2, bromotrichloromethane 0.2. This is designated copolymer A herein and has a solids content of 45 percent.

COPOLYMER B

A copolymer (molecular weight about 270,000 viscosity average) is prepared by emulsion polymerization of ethyl acrylate 89, 2--ethylhexyl acrylate 9, acrylic acid 1.0, methacrylamide 0.7, and mercaptan propionic acid 0.3. This is designated copolymer B and has a solids content of 48 percent.

COPOLYMER C

A copolymer (molecular weight about 155,00 viscosity average) is prepared by emulsion polymerization of ethyl acrylate 80, vinyl acetate 16, itaconic acid 2.5, methylol methacrylamide 1.0, and bromotrichloromethane 0.5. This is designated copolymer C and has a solids content of 44 percent.

COPOLYMER D

A copolymer (molecular weight about 262,000 viscosity average) is prepared by emulsion polymerization of ethyl acrylate 98.1, itaconic acid 1.5, acrylamide 0.2, and bromotrichloromethane 0.2. This is designated copolymer D and has a solids content of 45 percent.

COPOLYMER E

A copolymer (molecular weight about 232,000 viscosity average) is prepared by emulsion polymerization of ethyl acrylate 78.1, butyl acrylate 20, itaconic acid 1.5, acrylamide 0.2 methylol acrylamide 0.2, and bromotrichloromethane 0.2. This is designated copolymer E and has a solids content of 45 percent.

COPOLYMER F

A copolymer (molecular weight about 220,000 viscosity average) is prepared of ethyl acrylate 92, vinylidene chloride 5, itaconic acid 1.5, methacrylamide 1.5, and tertiary dodecyl mercaptan 1. This is designated copolymer F and has a solids content of 40 percent.

COPOLYMER G

A copolymer (molecular weight about 172,000 viscosity average) is prepared of ethyl acrylate 94, styrene 5, acrylic acid 0.2, acrylamide 0.2, N-methylol acrylamide 0.6, and bromotrichloromethane 0.6. This is designated copolymer G and has a solids content of 51 percent.

COPOLYMER H

A copolymer (molecular weight about 152,000 viscosity average) is prepared of ethyl acrylate 92.1, acrylonitrile 4, methacrylic acid 2.9, acrylamide 0.5, methylol acrylamide 0.5, and carbon tetrachloride 0.3. This is designated copolymer H and has a solids content of 46 percent.

POLYMER I

A polymer of about 170,000 viscosity average is prepared by emulsion polymerization of ethyl acrylate and 0.2 percent, based on the ethyl acrylate, of dodecyl mercaptan. It is designated as polymer I and has a solids content of 45 percent.

In the preparation of A, B, C and I, there is used about 3 percent, based on monomer weight, of t-octylphenoxypoly(40) ethoxyethanol as emulsifier.

In the preparation of D and E, there is used about 1 percent, based on monomer weight, sodium lauryl sulfate as emulsifier.

In the preparation of F and G, there is used about 2 percent, based on monomer weight, sodium dodecyl benzene sulfonate as an emulsifier.

In the preparation of H, there is used about 2 percent, based on monomer weight, trimethyl(dodecyl benzyl) ammonium chloride and 2 percent t-octylphenoxypoly(40) ethoxyethanol as coemulsifiers.

POLYMER J

An ethyl acrylate homopolymer dispersion is prepared by reflux polymerization using 1 percent, based on monomer weight, of sodium lauryl sulfate as the emulsifier. This produces a homopolymer with a molecular weight of about 1,000,000 viscosity average and about 45 percent solids. It is designated polymer J.

POLYMER K

A 45 percent solids butyl acrylate homopolymer dispersion is prepared by redox polymerization using about 3 percent based on monomer of t-octylphenoxypoly(40)ethoxyethanol and about 1 percent based on monomer of sodium lauryl sulfate. This produces a homopolymer with a molecular weight of about 950,000 viscosity average. It is designated polymer K herein.

on itself once end for end and the folds are held under a predetermined load for 5 minutes, after which the web is released and 5 minutes later the angle of recovery is measured (Monsanto Wrinkle Recovery Test—ASTM No. D 1295-67).

The following table I shows the results of this test and the observations of the nature of the treated web. The compositions of the polymer or polyblends of the examples in table I are as given in table II. In table II, component (1) of the polyblend is immediately above component (2) that is mixed with it.

TABLE I

| Example | Crease Recovery of Bonded Fabric | Tack | Resiliency |
|---|---|---|---|
| 1 | 105° | none | low |
| 2 | 100° | none | low |
| 3 | 110° | none | low |
| 4 | 110° | none | low |
| 5 | 115° | none | low |
| 6 | 115° | none | low |
| 7 | 110° | none | low |
| 8 | 105° | none | low |
| 9 | 100° | none | low |
| 10 | 106° | none | low |
| 11 | 115° | tacky | moderate |
| 12 | 135° | none | springy |
| 13 | ** | very tacky | ** |
| 14 | 145° | none | very springy |

**Tackiness interferes with measurement and observation

TABLE II

| Example | Polymer of polyblends | MFT of component (2) | Percent solids | Parts wet weight | Parts dry weight |
|---|---|---|---|---|---|
| 1 | Copolymer A | | 45 | 20 | 9 |
| | Poly(AN¹) | 130° C. | 29 | 3.5 | 1 |
| 2 | Copolymer A | | 45 | 20 | 9 |
| | Poly(VCl²) | 75° C. | 55 | 1.8 | 1 |
| 3 | Copolymer B | | 48 | 14.6 | 7 |
| | Polystyrene | 115° C. | 35 | 5.6 | 3 |
| 4 | Copolymer C | | 44 | 18.2 | 8 |
| | 60 VA³/40 VZ1² copolymer | 51° C. | 56 | 3.6 | 2 |
| 5 | Copolymer D | | 45 | 16.7 | 7.5 |
| | 30 VA³/70 VCl² copolymer | 60° C. | 56 | 4.5 | 2.5 |
| 6 | Copolymer E | | 45 | 15.5 | 7 |
| | Poly(MMA⁴) | 106° C. | 35 | 8.6 | 3 |
| 7 | Copolymer F | | 40 | 21.2 | 8.5 |
| | Polyvinyltoluene | 125° C. | 32 | 4.7 | 1.5 |
| 8 | Copolymer G | | 40 | 17.5 | 7 |
| | 50 VA³/50 MMA⁴ copolymer | 62° C. | 40 | 7.5 | 3 |
| 9 | Copolymer H | | 30 | 26.5 | 8 |
| | Poly(MMA⁴) | 106° C. | 35 | 5.7 | 2 |
| 10 | Polymer I | | 45 | 16.7 | 7.5 |
| | 30 VA³/70 VCl² copolymer | 60° C. | 56 | 4.5 | 2.5 |
| 11 | Polymer J | | 45 | 22.2 | 10 |
| 12 | Polymer J | | 45 | 16.5 | 75 |
| | 30 VA³/70 VCl² copolymer | 60° C. | 56 | 4.5 | 25 |
| 13 | Polymer K | | 51 | 19.6 | 10 |
| 14 | Polymer K | | 51 | 15.7 | 8 |
| | 30 VA³/70 VCl² copolymer | 60°C. | 56 | 3.6 | 2 |

¹ Acrylonitrile. ² Vinyl chloride. ³ Vinyl acetate. ⁴ Methyl methacrylate.

The minimum film forming temperatures (MFT) of all of the copolymers A through H and of polymers I, J and K are below room temperature and in most cases below 0° C.

1. Aqueous dispersions of various solids contents are prepared from other monomers by emulsion polymerization to produce polymers of normally high molecular weight (e.g. about 500,000 or higher viscosity average) to serve as component (2) in the polyblend. The following table summarizes the nature and proportion of the components of the aqueous dispersions which are diluted to 10 percent solids concentration, and then applied, on a textile pad at 900 percent wet pickup to a nonwoven web (of 1/1/1 cellulose acetate/rayon/nylon/ 66 having a 20 to 25 mil thickness and weighing 1¼ oz. per square yard) obtained on a cross-lap card. The impregnated webs are dried with infrared heat and cured at 150° C. for 5 minutes.

A sample (1½ cm. wide) of the bonded web is then folded

2. A web of cotton about 30 mils thick and weighing about 1½ oz./sq. yard made by a "Rando-Webber" is fed lengthwise over the top of a roll which is partially immersed in an aqueous dispersion containing the polyblend of example 5 in table II but at a concentration of 30 percent total solids containing 1 to 2 percent of methyl cellulose (about 29 percent weight percent of methoxyl and of 400 centipoise viscosity grade (2 percent in water at 25° C.)) as a thickener to raise the viscosity of the polymer dispersion to 15,000 to 40,000cps. The surface of the roll is made up of 2 sets of parallel ribs intersecting at a 90° C. angle, the width of the ribs being about 2½ mm. and the ribs in each set being spaced apart by 10 mm. The approaching and departing lengths of the web make an angle of about 105° with the apex at the top of the roll. The imprinted web is dried by passage between a pair of banks of infrared lamps disposed above and below the web and then the dried web is passed over a conventional folding guide to lap one longitudinal edge over the other. The overlapped edges proceed under a hot sealing roll in contact therewith to heat-seal the laps together by virtue of the fusion of the thermoplastic polymer deposits where the lines thereof in the overlapped edges are pressed lightly into contact under the heat-sealing roll. The bonded web cools after leaving the heat-sealing roll without any springing apart of the overlapped edges before the seal is sufficiently cooled to set. No difficulties are encountered by virtue of any adhesion of the web to parts of the equipment.

3. a. The procedure of 2 above is repeated with each of the polyblends designated examples 1 to 4, 6 to 10, 12 and 14 of table II. Satisfactory bonding (without springing apart of the overlapped edges) is obtained with examples 1 to 4 and 6 to 10. However, the overlapped edges of the webs impregnated by the polyblends of examples 12 and 14 spring apart after leaving the heat-sealing roll so that the edges are not adhered together to form a sleeve or tube. The springiness of the web pulls the edges apart before the fused binder can set by cooling action.

b. When the procedure 2 is repeated using Polymer J in one instance and polymer K in another (examples 11 and 13 in the table), the binder is so tacky in each instance that trouble is encountered with sticking to the guides and the heat sealing roll thereby causing distortions and in some instances tearing of the web.

I claim:

1. An adhesive composition comprising an aqueous dispersion of (1) a linear polymer of ethyl acrylate having an MFT not above room temperature and a molecular weight of about 150,000 to 300,000 viscosity average obtained by emulsion polymerization using 0.2 to 5 percent by weight, based on the total monomer weight, of a chain-transfer agent and (2) a polymer containing polymerized units of vinyl chloride, methyl methacrylate, styrene, vinyltoluene, or acrylonitrile which polymer has an MFT of at least about 50° C., the polymers being present in a proportion of 60 to 90 percent by weight of (1) and 40 to 10 percent by weight of (2) respectively.

2. A composition as defined in claim 1 in which (1) is a linear copolymer of ethyl acrylate with (a) 0 to 30 percent by weight of methyl acrylate, a ($C_3$–$C_8$) alkyl acrylate or a ($C_2$–$C_8$) alkyl methacrylate, (b) 0 to 5 percent by weight of vinyl acetate, methyl methacrylate, styrene, vinyltoluene, vinyl chloride, vinylidene chloride, or acrylonitrile, (c) 0 to 5 percent by weight of an $\alpha,\beta$-monoethylenically unsaturated acid, and 0 to 1 percent by weight of acrylamide, N-methylolacrylamide, methacrylamide, or N-methylol methacrylamide.

3. A nonwoven fabric bonded in at least a portion of its area with a composition comprising (1) a linear polymer of ethyl acrylate having an MFT not above room temperature and a molecular weight of about 150,000 to 300,000 viscosity average obtained by emulsion polymerization using 0.2 to 5 percent by weight, based on the total monomer weight, of a chain-transfer agent and (2) a polymer containing polymerized units of vinyl chloride, methyl methacrylate, styrene, vinyltoluene, or acrylonitrile which polymer has an MFT of at least about 50° C., the polymers being present in a proportion of 60 to 90 percent by weight of (1) and 40 to 10 percent by weight of (2) respectively.

4. A nonwoven fabric according to claim 3 in which (1) is a linear copolymer of ethyl acrylate with (a) 0 to 30 percent by weight of methyl acrylate, a ($C_3$–$C_8$) alkyl acrylate or a ($C_2$–$C_8$) alkyl methacrylate, (b) 0 to 5 percent by weight of vinyl acetate, methyl methacrylate, styrene, vinyltoluene, vinyl chloride, vinylidene chloride, or acrylonitrile, (c) 0 to 5 percent by weight of an $\alpha,\beta$-monoethylenically unsaturated acid, and 0 to 1 percent by weight of acrylamide, N-methylolacrylamide, methacrylamide, of N-methylol methacrylamide.

5. A nonwoven fabric according to claim 3 in which (1) is a linear copolymer of ethyl acrylate with (a) 0 to 30 percent by weight of methyl acrylate, a ($C_3$–$C_8$) alkyl acrylate of a ($C_2$–$C_8$) alkyl methacrylate, (b) 0 to 5 percent by weight of vinyl acetate, methyl methacrylate, styrene, vinyltoluene, vinyl chloride, vinylidene chloride, or acrylonitrile, (c) 0 to 5 percent by weight of an $\alpha,\beta$-monoethylenically unsaturated acid, and 0 to 1 percent by weight of acrylamide, methacrylamide, or N-methylol acrylamide and in which (2) is a polymer of vinyl chloride, methyl methacrylate, styrene, vinyltoluene, or acrylonitrile.

6. A nonwoven fabric bonded in at least a portion of its area with a dried deposit of a composition comprising (1) a linear polymer of ethyl acrylate having an MFT not above room temperature and a molecular weight of about 150,000 to 300,000 viscosity average obtained by emulsion polymerization using 0.2 to 5 percent by weight, based on the total monomer weight, of a chain-transfer agent and (2) a polymer containing polymerized units of vinyl chloride, methyl methacrylate, styrene, vinyltoluene, or acrylonitrile which polymer has an MFT of at least about 50° C., the polymers being present in a proportion of 60 to 90 percent by weight of (1) and 40 to 10 percent by weight of (2) respectively, said fabric being in the form of a sleeve wherein a longitudinal edge is overlapped on and heat-sealed to the opposite longitudinal edge of the fabric.